United States Patent Office 3,075,040
Patented Jan. 22, 1963

3,075,040
METHOD FOR IMPROVING THE ELECTRIC STRENGTH AND FLASH-OVER OR GLOW-DISCHARGE RESISTANCE OF OLEFINE POLYMERS
Jost Lemmerich, Berlin-Siemensstadt, and Ulrich Oestreich, Berlin-Charlottenburg, Germany, assignors to Siemens-Schuckertwerke Aktiengesellschaft, Berlin-Siemensstadt, Germany, a corporation of Germany
No Drawing. Filed July 16, 1958, Ser. No. 748,803
Claims priority, application Germany July 26, 1957
6 Claims. (Cl. 174—110)

Our invention relates to electric insulating materials of great dielectric strength and high flash-over resistance for use at high voltages such as in the order of kilovolts.

In the recent past, synthetic high-polymers have found increasing application as insulating materials in various electrical arts. In particular, olefine polymers, chiefly polyethylene, polyisobutylene or polypropylene, for example, are generally suitable as insulating materials for electric cables and wires due to their good mechanical properties and workability in conjunction with excellent electrical properties. For high-voltage purposes, however, the use of such substances has been possible only within narrow limits because of their unsatisfactory dielectric strength and their limited resistance to flash-over and glow discharges.

It is an object of our invention to improve the above-mentioned substances with respect to such deficiencies.

According to our invention, we found that the dielectric strength, as well as the resistance to glow discharges, is greatly increased by adding to the olefine polymers of the above-mentioned type slight or minor amounts of a linear-chain or branched-chain paraffin hydrocarbon. Suitable for the purposes of the invention are particularly hydrocarbons whose melting point is below 20° C. and whose boiling point is above 120° C. The hydrocarbon to be used for the invention may also have substituted aromatic rings. The added hydrocarbon may be substituted at the aromatic ring by a halogen, for example chlorine, provided that adverse effects on the characteristics required in a dielectric material do not become unacceptable.

Examples of compounds suitable for the purposes of this invention are the following:

(1) Paraffin oils with boiling points up to 250° C.
(2) Butylbenzene, dodecylbenzene, p-dibutylbenzene, 2,5-dimethylisopropylbenzene, diphenyldecane, tristyrene, α or β methylnaphthalene, α,β dimethylnaphthalene.
(3) 2 or 3-chlorotoluene, p-chlorobutylbenzene, 2,5-dichlorobutylbenzene, 1 chloronaphthalene.

The preferred compounds are the hydrocarbons of sections 1 and 2.

According to international nomenclature, tristyrene is 2,4,6-triphenylhexene.

It is advantageous to improve the resistance to aging of the added hydrocarbon substance by adding slight amounts of a protective agent. For example the destructive action of copper may be eliminated by addition of chelate forming compounds such as N,N'-di(o-hydroxybenziliden)-ethenediamin or N,N'-di(o-hydroxybenziliden)-hexamethylenediamine. Adding these compounds eliminates danger of aging that may be caused by heat during admixing the hydrocarbon substance to the polymeric base material, as well as aging during subsequent use of the material. The hydrocarbon addition substance is preferably added on hot rolls of a roll mill.

The quantity of the admixed hydrocarbon substance may be as high as the limit of its compatibility with the base material. As a rule, quantities up to 20%, at least about .2%, preferably about 5 to 10%, are sufficient to obtain satisfactory improvement in the properties of the polymer base material.

An addition made according to the invention also improves the compatibility of the olefine polymers with respect to filler substances. As a result, it becomes possible, for example, to provide polyethylene with inorganic filler substances (viz. ultrafine $TiO_2$ or $BaTiO_3$) in slight or minor amounts, to obtain improvement in a desired or specific property, for example, in its thermal conductivity. The improvement of the dielectric strength and in the resistance to glow discharges, obtainable by virtue of this invention, is apparent from the following tabulation containing the results of comparative tests. Set forth in the tabulation are the dielectric strength and resistance to glow discharges of a commercially available substance, and comparison is made therein with the same substance to which a hydrocarbon substance was added according to the instant invention.

| | Insulating strength in kv./mm. at 20°C. thickness of insulation: 1 mm. | Glow-discharge resistance in min. at 20°C., 20 kv. |
|---|---|---|
| (1) High pressure polyethylene without addition | 40 | 100 |
| (2) High pressure polyethylene with addition of 10 parts paraffin oil to 100 parts polyethylene | 62 | 2,100 |
| (3) High pressure polyethylene with addition of 7.5 parts dodecylbenzene | 62 | 3,000 |
| (4) Low pressure polyethylene without addition | 28 | 100 |
| (5) Low pressure polyethylene with addition of 7.5 parts dodecylbenzene | 84 | 6,500 |

We claim:

1. An insulated high-voltage conductor carrying current at a high voltage of at least a kilovolt, the insulation being a solid-phase polymer taken from the group consisting of polyethylene, polypropylene and polyisobutylene, the polymer having incorporated therein an organic substance whose melting point is below 20° C. and whose boiling point is above 120° C., said substance comprising from about 0.2 to about 20% of the weight of said polymer, and being taken from the group consisting of paraffin oils with boiling points up to 250° C.; butyl benzene; dodecylbenzene; p-dibutylbenzene; 2,5-dimethylisopropylbenzene; diphenyldecane; tristyrene; alpha-methyl-naphthalene; beta-methylnaphthalene; alpha,beta-dimethylnaphthalene; said compound serving to improve the dielectric strength and resistance to flash-over and glow-discharge of the polymer.

2. The insulated conductor defined in claim 1, the solid-phase polymer being polyethylene.

3. An insulated high-voltage electric conductor carrying current at a high voltage of at least a kilovolt, the insulation being solid-phase polyethylene having incorporated therein a paraffin hydrocarbon oil boiling below 250° C. in an amount of about 0.2 to about 20% of the weight of the polyethylene.

4. An insulated high-voltage electric conductor carrying current at a high voltage of at least a kilovolt, the insulation being solid-phase polyethylene having incorporated therein p-dibutyl benzene in an amount of about 0.2 to about 20% of the weight of the polyethylene.

5. An insulated high-voltage electric conductor carrying current at a high voltage of at least a kilovolt, the insulation being solid-phase polyethylene having incorporated therein 2,5-dimethylisopropyl-benzene in an amount of about 0.2 to about 20% of the weight of the polyethylene.

6. An insulated high-voltage electric conductor carrying current at a high voltage of at least a kilovolt, the insulation being solid-phase polyethylene having incorporated therein tristyrene in an amount of about 0.2 to about 20% of the weight of the polyethylene.

References Cited in the file of this patent

UNITED STATES PATENTS

| | | |
|---|---|---|
| 1,633,956 | Rodman | June 28, 1927 |
| 2,124,235 | Mueller-Cunradi | July 19, 1938 |
| 2,316,087 | Gaynor et al. | Apr. 6, 1943 |
| 2,465,296 | Swiss | Mar. 22, 1949 |
| 2,480,295 | Kent et al. | Aug. 30, 1949 |
| 2,509,620 | Watson et al. | May 30, 1950 |
| 2,717,839 | Wright et al. | Sept. 13, 1955 |
| 2,749,248 | Benson | June 5, 1956 |
| 2,870,385 | Rice et al. | Jan. 20, 1959 |
| 2,921,059 | Guillet et al. | Jan. 12, 1960 |
| 2,938,018 | Schmerling | May 24, 1960 |
| 2,980,964 | Dilke | Apr. 25, 1961 |

FOREIGN PATENTS

| | | |
|---|---|---|
| 533,444 | Great Britain | Feb. 13, 1941 |
| 584,672 | Great Britain | Jan. 21, 1947 |
| 713,174 | Great Britain | Aug. 4, 1954 |
| 517,817 | Canada | Oct. 25, 1955 |